US010631051B2

(12) United States Patent
Huang

(10) Patent No.: US 10,631,051 B2
(45) Date of Patent: Apr. 21, 2020

(54) METHOD AND SYSTEM FOR STARTING SMART TELEVISION

(71) Applicant: SHENZHEN TCL DIGITAL TECHNOLOGY LTD., Shenzhen, Guangdong (CN)

(72) Inventor: Gaobo Huang, Guangdong (CN)

(73) Assignee: SHENZHEN TCL DIGITAL TECHNOLOGY LTD., Shenzhen (CN)

(*) Notice: Subject to any disclaimer, the term of this patent is extended or adjusted under 35 U.S.C. 154(b) by 0 days.

(21) Appl. No.: 16/307,939

(22) PCT Filed: Aug. 19, 2016

(86) PCT No.: PCT/CN2016/096017
§ 371 (c)(1),
(2) Date: Dec. 6, 2018

(87) PCT Pub. No.: WO2017/211009
PCT Pub. Date: Dec. 14, 2017

(65) Prior Publication Data
US 2019/0268654 A1 Aug. 29, 2019

(30) Foreign Application Priority Data
Jun. 6, 2016 (CN) .............................. 2016 1 035623

(51) Int. Cl.
H04N 21/443 (2011.01)
H04N 21/439 (2011.01)
G06F 1/32 (2019.01)

(52) U.S. Cl.
CPC ............. H04N 21/443 (2013.01); G06F 1/32 (2013.01); H04N 21/4396 (2013.01); H04N 21/4432 (2013.01); H04N 21/4436 (2013.01)

(58) Field of Classification Search
CPC .................................................. H04N 21/443
See application file for complete search history.

(56) References Cited

U.S. PATENT DOCUMENTS 7,581,034 B2 * 8/2009 Polivy .................. G06F 3/1438
709/250
7,634,780 B2 * 12/2009 Rhoten .................... G06F 3/14
345/1.1
(Continued)

FOREIGN PATENT DOCUMENTS

CN 1641573 A 7/2005
CN 1797332 A 7/2006
(Continued)

OTHER PUBLICATIONS

International Search Report of PCT Patent Application No. PCT/CN2016/096017 dated Feb. 13, 2017.

Primary Examiner — Brian P Yenke

(57) ABSTRACT

Disclosed a smart television starting method, which includes: in a Suspend To RAM (STR) starting process of a smart television, acquiring a signal format and a video display control parameter corresponding to the signal format from a preset memory stored during last shutdown of the smart television after a kernel is recovered completely; setting a register group of each driver associated with video displaying according to the video display control parameter if the stored video display control parameter is obtained; when a signal lock notification sent by a driver layer is received, obtaining a signal format of a current lock signal from the signal lock notification; if the signal format of the lock signal is the same as the stored signal format, releasing a mute state of a to-be-played video corresponding to the current signal and playing the to-be-played video; The disclosure further provides a system for starting smart television.

14 Claims, 4 Drawing Sheets

(56) References Cited

U.S. PATENT DOCUMENTS

| | | | | |
|---|---|---|---|---|
| 7,685,466 B2* | 3/2010 | Dunstan | ............ | G06F 11/0793 713/323 |
| 8,411,870 B2* | 4/2013 | Shimoharada | ......... | G06F 3/165 381/55 |
| 8,424,084 B2* | 4/2013 | Kondo | ................. | G06F 21/64 726/22 |
| 8,583,951 B2* | 11/2013 | Kuno | ................. | G11B 19/02 713/300 |
| 8,804,039 B2* | 8/2014 | Kim | ................... | G06F 9/4401 348/564 |
| 8,856,832 B2* | 10/2014 | Jeong | ............... | H04N 5/44513 725/100 |
| 8,893,135 B2* | 11/2014 | Yukawa | ............ | H04N 21/4432 718/102 |
| 8,918,629 B2* | 12/2014 | Cho | ................... | G06F 9/4418 713/1 |
| 9,041,862 B2* | 5/2015 | Kim | ................... | G06F 9/4401 348/564 |
| 9,167,300 B2* | 10/2015 | McRae | ............... | H04N 21/454 |
| 9,407,951 B2* | 8/2016 | Oh | ..................... | H04N 21/4622 |
| 9,578,272 B2* | 2/2017 | Kim | ..................... | G06F 9/4401 |
| 9,628,862 B2* | 4/2017 | Kwon | ............... | H04M 1/72522 |
| RE46,456 E* | 6/2017 | Katoh | | |
| 9,678,763 B2* | 6/2017 | Park | ................... | H04N 21/441 |
| 9,684,519 B2* | 6/2017 | Wu | ....................... | G06F 9/441 |
| 2002/0062455 A1* | 5/2002 | Lee | ..................... | G06F 1/3203 713/323 |
| 2005/0182612 A1* | 8/2005 | Anderson | ............ | G06F 1/3234 703/18 |
| 2005/0244131 A1* | 11/2005 | Uehara | ................ | G09G 5/363 386/219 |
| 2006/0053311 A1* | 3/2006 | Chary | ................. | G06F 1/3203 713/300 |
| 2006/0130075 A1* | 6/2006 | Rhoten | .................. | G06F 3/14 719/328 |
| 2006/0164324 A1* | 7/2006 | Polivy | .................. | G06F 3/1438 345/1.1 |
| 2007/0064153 A1* | 3/2007 | Obara | ................. | G06F 1/3203 348/554 |
| 2007/0136230 A1* | 6/2007 | Kwon | ................. | G06F 21/575 |
| 2007/0150760 A1* | 6/2007 | Nowlin | ................ | G06F 1/3203 713/300 |
| 2007/0234093 A1* | 10/2007 | Kimura | ................ | G06F 1/3203 713/323 |
| 2007/0283187 A1* | 12/2007 | Dunstan | ............. | G06F 11/0793 714/24 |
| 2008/0151127 A1* | 6/2008 | Ryou | .................... | H04N 7/163 348/739 |
| 2009/0144537 A1* | 6/2009 | Morisawa | .............. | G06F 9/441 713/2 |
| 2011/0040938 A1* | 2/2011 | Jeon | ..................... | G06F 9/4418 711/118 |
| 2011/0084899 A1* | 4/2011 | Jung | ................. | H04N 5/44508 345/156 |
| 2012/0086857 A1* | 4/2012 | Kim | ................... | G06F 9/4401 348/563 |
| 2012/0090004 A1* | 4/2012 | Jeong | ................ | H04N 5/44513 725/39 |
| 2012/0233451 A1* | 9/2012 | Liu | ...................... | G06F 1/3203 713/2 |
| 2014/0055673 A1* | 2/2014 | Sirpal | ................... | H04N 21/40 348/563 |
| 2014/0139741 A1 | 5/2014 | Momosaki et al. | | |
| 2014/0325560 A1* | 10/2014 | Kim | ..................... | G06F 9/4401 725/37 |
| 2015/0019908 A1* | 1/2015 | Heo | ................... | G06F 11/1458 714/15 |
| 2015/0121412 A1* | 4/2015 | McRae | ................. | H04N 21/454 725/25 |
| 2015/0194087 A1* | 7/2015 | Choi | ........................ | G09G 3/20 345/212 |
| 2015/0195604 A1* | 7/2015 | Synowiec | ............. | H04N 21/41 361/679.22 |
| 2015/0229870 A1* | 8/2015 | Kim | ..................... | G06F 9/4401 348/552 |
| 2015/0253834 A1* | 9/2015 | Park | ..................... | G06F 1/3206 345/211 |
| 2016/0041931 A1* | 2/2016 | Gupta | .................. | G06F 9/4856 710/8 |
| 2016/0132222 A1* | 5/2016 | Yoo | ...................... | G06F 3/0486 715/763 |
| 2016/0267883 A1* | 9/2016 | Bibikar | ................ | G09G 5/36 |
| 2017/0220357 A1* | 8/2017 | Choi | ...................... | G09G 5/36 |
| 2019/0189080 A1* | 6/2019 | Choi | .................... | G09G 5/006 |

FOREIGN PATENT DOCUMENTS

| | | |
|---|---|---|
| CN | 101515194 A | 8/2009 |
| CN | 102609274 A | 7/2012 |
| CN | 102866934 A | 1/2013 |
| CN | 102880477 A | 1/2013 |
| CN | 104021058 A | 9/2014 |
| CN | 104461643 A | 3/2015 |
| EP | 2518626 A2 | 10/2012 |
| JP | 2010129020 A | 6/2010 |

* cited by examiner

METHOD AND SYSTEM FOR STARTING SMART TELEVISION

TECHNICAL FIELD

The present disclosure relates to the field of smart television technology, and more particularly relates to a method and a system for starting smart television.

BACKGROUND

With the rapid development of smart television (TV), more and more functions have been integrated into the smart TV and the functions of smart TV have become more and more powerful. In order to adapt to these powerful new functions, TVs are generally equipped with multi-core CPUs with powerful hardware performance, as well as newer version of smart operating system. At the same time, as these hardware and operating systems become more and more complex, system programs are getting larger and larger, and startup speed of the TVs are getting slower and slower. In order to solve the problem of slow TV startup, Suspend To RAM (STR) quick starting technology is gradually applied to the field of smart TV.

The STR quick starting technology is completely different from the normal TV starting process. The normal starting process follows initialization process. Each hardware and software modules of the system need to be initialized. The STR starting does not go through the initialization process, and follows the recovery and restore process, which is, directly restoring the system operating status before the last shutdown from the memory. The STR starting process requires basic hardware support and requires memory to be powered in standby status.

However, during the STR standby status, since the System-on-a-Chip (SOC) chip, demodulator (DEMOD) and tuner chip have been completely powered off, when the STR is started next time, register groups of each driver related to the video displaying need to be set according to the input source of the locked signal when received the signal locking notification, to display the video signal of the signal source. Only after it is set completely, the video of the above signal source can be played normally. However, the parameters of each driver related to the video display are set according to the input source of the locked signal, the process of which takes a long time to start, and resulting in a slow starting of the smart TV.

SUMMARY

The present disclosure provides a starting method and system for a smart TV, the main purpose of which is to solve the technical problem that the smart TV cannot be quickly started.

To achieve the above purpose, the present disclosure provides a smart television starting method, and it includes:

in a Suspend To RAM starting process of a smart television in standby mode, obtaining an input source and a video display control parameter corresponding to the input source from a preset memory stored during last shutdown of the smart television after a kernel is recovered completely, wherein the preset memory does not power down during the smart television is in standby mode;

setting a register group of each driver associated with video displaying according to the video display control parameter if the stored video display control parameter is obtained; when a signal locking notification sent by a driver layer is received, obtaining an input source of a current lock signal from the signal locking notification; if the input source of the lock signal is the same as the stored input source, releasing a mute state of a to-be-played video corresponding to the current signal and playing the to-be-played video;

if the input source of the lock signal is a digital television signal, then:

if the input source of the lock signal is the same as the stored input source, releasing the mute state of a to-be-played video corresponding to the current signal and playing the to-be-played video when receiving a notification that audio and video signals sent by the driver layer are synchronized completely;

if the input source of the lock signal is different from the stored input source, setting a register group of each driver associated with video displaying according to the input source of the lock signal; releasing a mute state of a to-be-played video corresponding to the current signal and playing the to-be-played video after the register group of each driver associated with video displaying has been set;

if the stored video display control parameter is not obtained, obtaining an input source of a current lock signal from the signal locking notification when a signal locking notification sent by a driver layer is received; setting a register group of each driver associated with video displaying according to the input source of the lock signal; releasing a mute state of a to-be-played video corresponding to the current signal and playing the to-be-played video after the register group of each driver has been set.

To achieve the above purpose, the present disclosure provides a smart television starting method, and it includes:

in a Suspend To RAM starting process of a smart television, obtaining an input source and a video display control parameter corresponding to the input source from a preset memory stored during last shutdown of the smart television after a kernel is recovered completely, wherein the preset memory does not power down during the smart television is in standby mode;

setting a register group of each driver associated with video displaying according to the video display control parameter if the stored video display control parameter is obtained;

obtaining an input source of a current lock signal from the signal locking notification when a signal locking notification sent by a driver layer is received;

if the input source of the lock signal is the same as the stored input source, releasing a mute state of a to-be-played video corresponding to the current signal and playing the to-be-played video.

Optionally, subsequent to the operation of obtaining an input source and a video display control parameter corresponding to the input source from a preset memory stored during last shutdown of the smart television, the method further includes:

if the stored video display control parameter is not obtained, obtaining an input source of a current lock signal from a signal locking notification when the signal locking notification sent by a driver layer is received;

setting a register group of each driver associated with video displaying according to the input source of the lock signal;

releasing a mute state of a to-be-played video corresponding to the current signal and playing the to-be-played video after the register group of each driver has been set.

Optionally, if the input source of the lock signal is a digital television signal, then the operation of if the input source of the lock signal is the same as the stored input source, releasing a mute state of a to-be-played video corresponding to the current signal and playing the to-be-played video includes:

if the input source of the lock signal is the same as the stored input source, releasing a mute state of a to-be-played video corresponding to the current signal and playing the to-be-played video when receiving a notification that audio and video signals sent by the driver layer are synchronized completely.

Optionally, if the input source of the lock signal is a digital television signal, then the operation of releasing the mute state of a to-be-played video corresponding to the current signal and playing the to-be-played video when the register group of each driver is completed setting includes:

after the register group of each driver associated with video displaying is completed setting, releasing a mute state of a to-be-played video corresponding to the current signal and playing the to-be-played video when receiving a notification that audio and video signals sent by the driver layer are synchronized completely.

Optionally, subsequent to the operation of obtaining an input source of a current lock signal from the signal locking notification when a signal locking notification sent by a driver layer is received, the method further includes:

if the input source of the lock signal is different from the stored input source, setting a register group of each driver associated with video displaying according to the input source of the lock signal; and releasing the mute state of a to-be-played video corresponding to the current signal and playing the to-be-played video after the register group of each driver associated with video displaying has been set.

Optionally, if the input source of the lock signal is a digital television signal, then the operation of releasing the mute state of a to-be-played video corresponding to the current signal and playing the to-be-played video when the register group of each driver associated with video displaying is completed setting includes:

after the register group of each driver associated with video displaying is completed setting, releasing a mute state of a to-be-played video corresponding to the current signal and playing the to-be-played video when receiving a notification that audio and video signals sent by the driver layer are synchronized completely.

In addition, to achieve the above purpose, the present disclosure provides a smart television starting system, and it includes:

an obtaining module, configured to obtain an input source and a video display control parameter corresponding to the input source from a preset memory stored during last shutdown of the smart television after a kernel is recovered completely, in a Suspend To RAM starting process of a smart television in standby mode, wherein the preset memory does not power down during the smart television is in standby mode;

a setting module, configured to set a register group of each driver associated with video displaying according to the video display control parameter if the stored video display control parameter is obtained;

the obtaining module, being further configured to obtain an input source of a current lock signal from the signal locking notification when a signal locking notification sent by a driver layer is received;

a performing module, configured to release the mute state of a to-be-played video corresponding to the current signal and playing the to-be-played video if the input source of the lock signal is the same as the stored input source.

Optionally, if the stored video display control parameter is not obtained, obtaining an input source of a current lock signal from a signal locking notification when the signal locking notification sent by a driver layer is received;

the setting module is further configured to set a register group of each driver associated with video displaying according to the input source of the lock signal;

the performing module is further configured to release the mute state of a to-be-played video corresponding to the current signal and playing the to-be-played video after the register group of each driver has been set.

Optionally, if the input source of the lock signal is a digital television signal, then the performing module is further configured to release the mute state of a to-be-played video corresponding to the current signal and playing the to-be-played video when receiving a notification that audio and video signals sent by the driver layer are synchronized completely, if the input source of the lock signal is the same as the stored input source.

Optionally, if the input source of the lock signal is different from the stored input source, setting a register group of each driver associated with video displaying according to the input source of the lock signal; and the performing module is further configured to release the mute state of a to-be-played video corresponding to the current signal and playing the to-be-played video after the register group of each driver associated with video displaying has been set.

Optionally, if the input source of the lock signal is a digital television signal, then then the performing module is further configured to releasing the mute state of a to-be-played video corresponding to the current signal and playing the to-be-played video when the register group of each driver associated with video displaying is completed setting, if received a notification that audio and video signals sent by the driver layer are synchronized completely.

The starting method and system of the smart television proposed by the disclosure, in a Suspend To RAM (STR) starting process of a smart television, obtaining an input source and a video display control parameter corresponding to the input source from a preset memory stored during last shutdown of the smart television after a kernel is recovered completely, setting a register group of each driver associated with video displaying according to the video display control parameter, obtaining an input source of a current lock signal from the signal locking notification when a signal locking notification sent by a driver layer is received. If the input source of the lock signal is the same as the stored input source, releasing a mute state of a to-be-played video corresponding to the current signal and playing the to-be-played video. In this way, in the process of starting the smart TV by the STR mode, the register group of each driver related to the video display can be set according to the stored video display control parameter in the drive recovery and restoration phase, and the lock signal is received after receiving the signal locking notification. If the input source is the same as the stored input source, and the video is directly decoded by MUTE. Compared with the existing mode startup process, the time taken to set the video display control parameters is greatly shortened, and the display speed of the screen during the startup process of the smart TV is improved. In turn, it increases its startup speed.

BRIEF DESCRIPTION OF THE ACCOMPANYING DRAWINGS

Various implementations, functional features, and advantages of this disclosure will now be described in further detail in connection with some illustrative embodiments and the accompanying drawings.

DETAILED DESCRIPTION OF ILLUSTRATIVE EMBODIMENTS

It is understood that the specific embodiments described herein are merely illustrative of the disclosure and are not intended to limit the disclosure.

Figure 1:
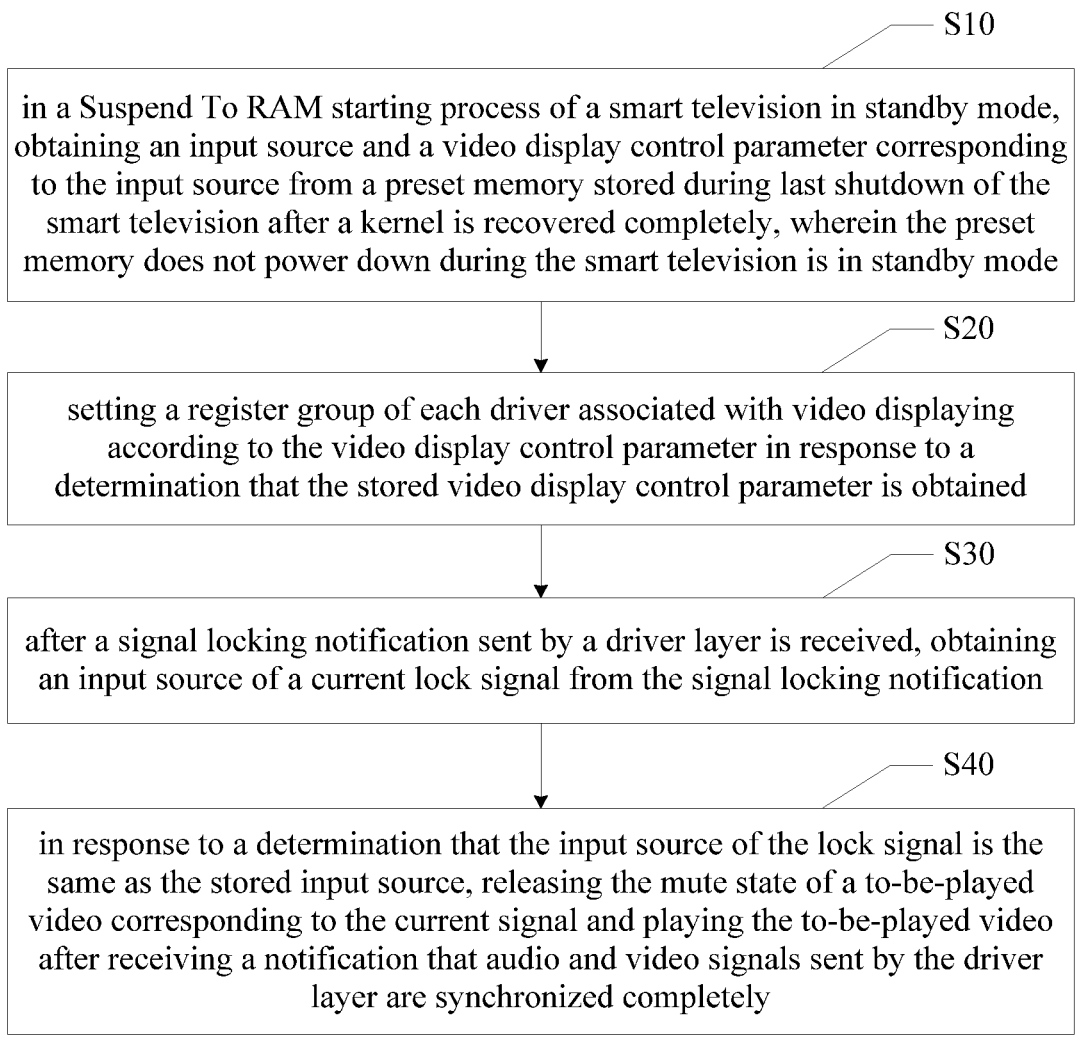
FIG. 1 is a flowchart of the first embodiment of a method for starting smart television in accordance with this disclosure.

The disclosure provides a method for starting smart television. Referring to FIG. 1, a flowchart of the first embodiment of a method for starting smart television in accordance with this disclosure is shown.

In this embodiment, the method for starting smart television includes operations S10 to S60.

In S10, in a Suspend To RAM starting process of a smart television, obtaining an input source and a video display control parameter corresponding to the input source from a preset memory stored during last shutdown of the smart television after a kernel is recovered completely, wherein the preset memory does not power down during the smart television is in standby mode.

In S20, setting a register group of each driver associated with video displaying according to the video display control parameter if the stored video display control parameter is obtained.

In this embodiment, the smart TV is started by the STR mode. After receiving the open command from the remote controller, the standby CPU supplies power to the main SOC chip. After the main SOC chip is powered on, the boot program module (boot & loader) is started firstly. The boot & loader module will load the system running information stored by the smart TV during the last shutdown from the memory, that is, the image saved in the Double Data Rate SDRAM (DDR) memory before the last shutdown, recovering and restoring directly the system including the main CPU. The system kernel module of the operating system restores according to the information stored in the memory. Generally, after the reply of the boot & loader module is completed, the system kernel is also basically restored. Then, the data recovery of each driver of the system is performed, which mainly includes the data setting of the driver related to the video display and the data setting of the driver other than the driver related to the video display.

Among them, the STR startup mode is a boot mode that suspends to memory. When starting, it does not go through the initialization process, but takes the system recovery and restore process, and directly restores the system running state before the last shutdown from the DDR memory.

In the shutting down process of the smart TV in the STR mode, when the TV is in STR standby, the standby process passes to the driver layer after the standby of the operating system application, architecture, and middleware standby are all finished. The software modules of the driver layer are also standby, in this process, the driver layer backs up the input source of the lock signal and the corresponding video display control parameters into the DDR memory, and the video display control parameters include register group data of various drivers related to the video display.

The video display control parameters mainly include: a frame rate conversion parameter, an image quality parameter, and a Scaler parameter. Among these, the image quality parameter includes: picture color, image quality enhancement, gamma (gamma value, generally related to the distortion of the output image relative to input signal), white balance, brightness, contrast, sharpness, etc.; the Scaler parameter includes resolution format information, zoom window size, position and so on.

In this embodiment, after the kernel module is restored, when the system is running to the process of obtaining the stored video display control parameter, the video display control parameter stored at the last shutdown is read from the preset memory. When the smart TV is in the STR mode, the preset memory remains unpowered. The preset memory can be DDR memory or the like. After obtaining the video display control parameter, the register group of each driver related to the video display is set according to the video display control parameter. Specifically, when the frame rate conversion module drives the restore setting, the register group data related to the frame rate conversion in the video display control parameter is saved before the shutdown from the DDR memory, the data is performed to restore to the corresponding frame rate conversion module register group; when the image quality module is driven and restored, the register group data related to the video display control parameters saved before the shutdown are read from the DDR memory. These parameters includes Color, image quality enhancement, gamma, white balance, brightness, contrast, sharpness and other image quality related register group data. The data is restored to the register group corresponding image quality module. When Scaler module restore settings, the DDR memory is used to read the register group data related to video display control parameters saved before the shutdown, including the resolution format, the zoom window size, and the position. The data is restored setting to the corresponding register group of the Scaler module.

It should be noted that the data setting of the driver other than the driver related to the video display may be synchronized with the data setting of the driver related to the video display, or after or before the data setting of the driver related to the video display. And follow the general setup process.

It can be understood that after the above-mentioned drivers are all restored, the system will successively perform recovery of the middleware control software layer, recovery of the architecture and application of the operating system (such as Android system), and finally complete the basic recovery of the system.

It should be noted that the memory of the smart TV can be DDR memory, or any other forms of memory can be powered in the standby state.

In S30, obtaining an input source of a current lock signal from the signal locking notification when a signal locking notification sent by a driver layer is received.

In S40, if the input source of the lock signal is the same as the stored input source, releasing a mute state of a to-be-played video corresponding to the current signal and playing the to-be-played video.

After completing the recovery of the above-mentioned kernel, driver, middleware control layer, operating system architecture and application, for the TV system, only the basic system is restored, and the TV screen cannot be displayed. To complete the display of the TV screen, the application layer needs to respond to the signal locking notification sent by the driver layer and further process it.

For smart TVs, users can use different sources according to their needs, such as Digital TV (DTV) Signal source, Analog TV signal (ATV) source, High Definition Multimedia Interface (HDMI) source, color difference component interface (YPbYr) source, etc. For different signal sources, the signal resolution corresponding to the signal and the refresh rate of the video are different.

Figure 2:
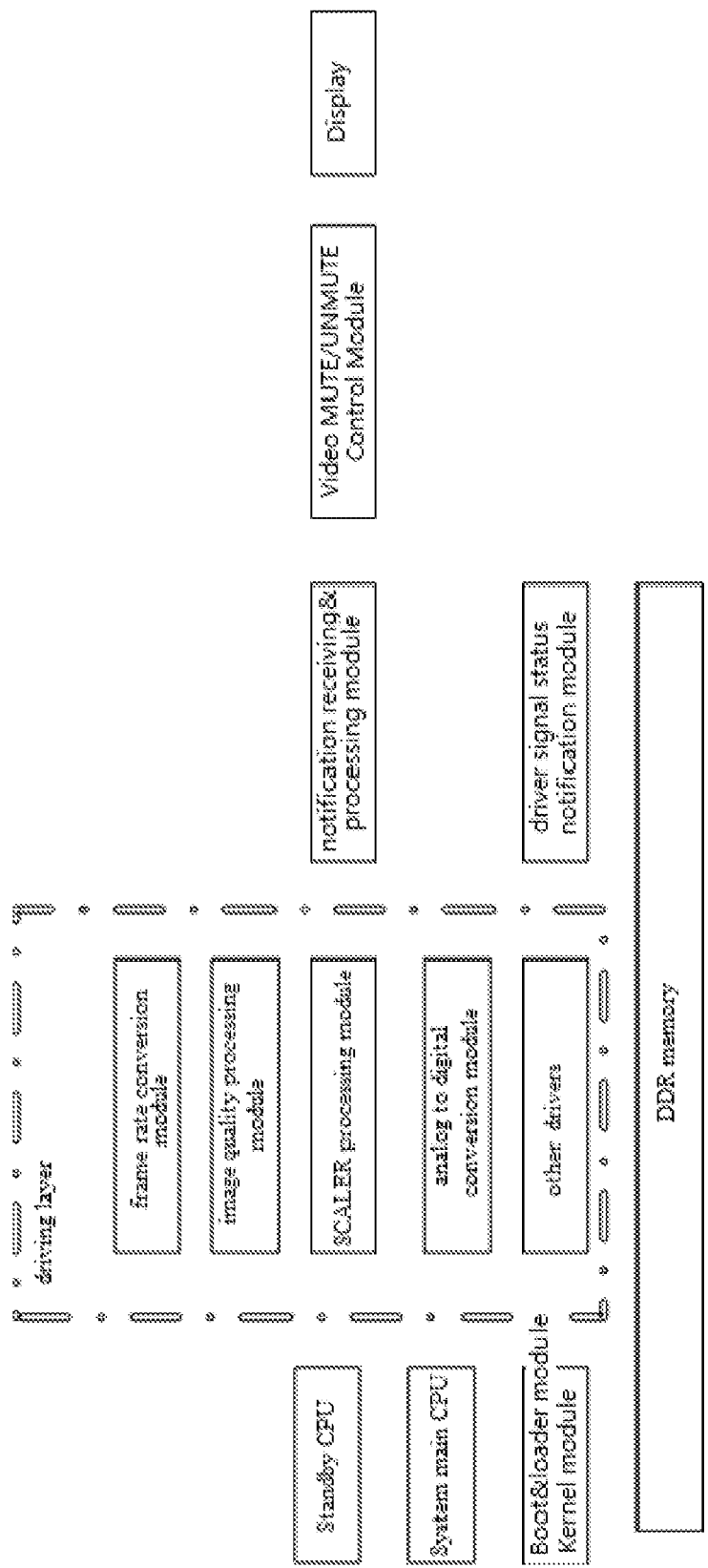
FIG. 2 is an architecture diagram illustrating system modules of a smart television involved in the first embodiment of a method for starting smart television in accordance with this disclosure.

Referring to FIG. 2, after the driving layer locks the video signal according to the signal source used by the smart TV, the driving signal status notification module sends a signal locking notification to the application layer, where the signal locking notification includes an input source of the locking signal, in the application. When the application layer receives the signal locking notification sent by the driver layer, the input source of the lock signal is obtained from the signal locking notification, where the signal resolution corresponding to the signal and the refresh rate of the video are different for different signal sources. Therefore, when judging whether the input source of the lock signal is the same as the stored input source, it can be judged according to the signal resolution and/or the refresh rate of the video.

If they are the same, an interface function used to the MUTE demodulation can be directly called to unmute the video screen and sound, the video is displayed from the display screen, and the sound will be played out from the speaker to achieve the video playing of the corresponding signal. When the video to be played is in a mute state, the display screen is a blue screen or a black screen, and the like, and the sound is muted. The so-called unmute state refers to the video to be played is displayed by the video MUTE/UNMUTE control module, the sound of the video is played through the speaker.

Generally, after the user selects the source when using the smart TV, the input source is generally determined. Therefore, the input source of the smart TV at the current startup is the same as that of the last shutdown. Therefore, in this case, the display speed of the television screen can be accelerated in this way.

The starting method of the smart television proposed by the disclosure, in a Suspend To RAM (STR) starting process of a smart television, obtaining an input source and a video display control parameter corresponding to the input source from a preset memory stored during last shutdown of the smart television after a kernel is recovered completely, setting a register group of each driver associated with video displaying according to the video display control parameter, obtaining an input source of a current lock signal from the signal locking notification when a signal locking notification sent by a driver layer is received. If the input source of the lock signal is the same as the stored input source, releasing a mute state of a to-be-played video corresponding to the current signal and playing the to-be-played video. In this way, in the process of starting the smart TV by the STR mode, the register group of each driver related to the video display can be set according to the stored video display control parameter in the drive recovery and restoration phase, and the lock signal is received after receiving the signal locking notification. If the input source is the same as the stored input source, and the video is directly decoded by MUTE. Compared with the existing mode startup process, the time taken to set the video display control parameters is greatly shortened, and the display speed of the screen during the startup process of the smart TV is improved. In turn, it increases its startup speed.

Figure 3:
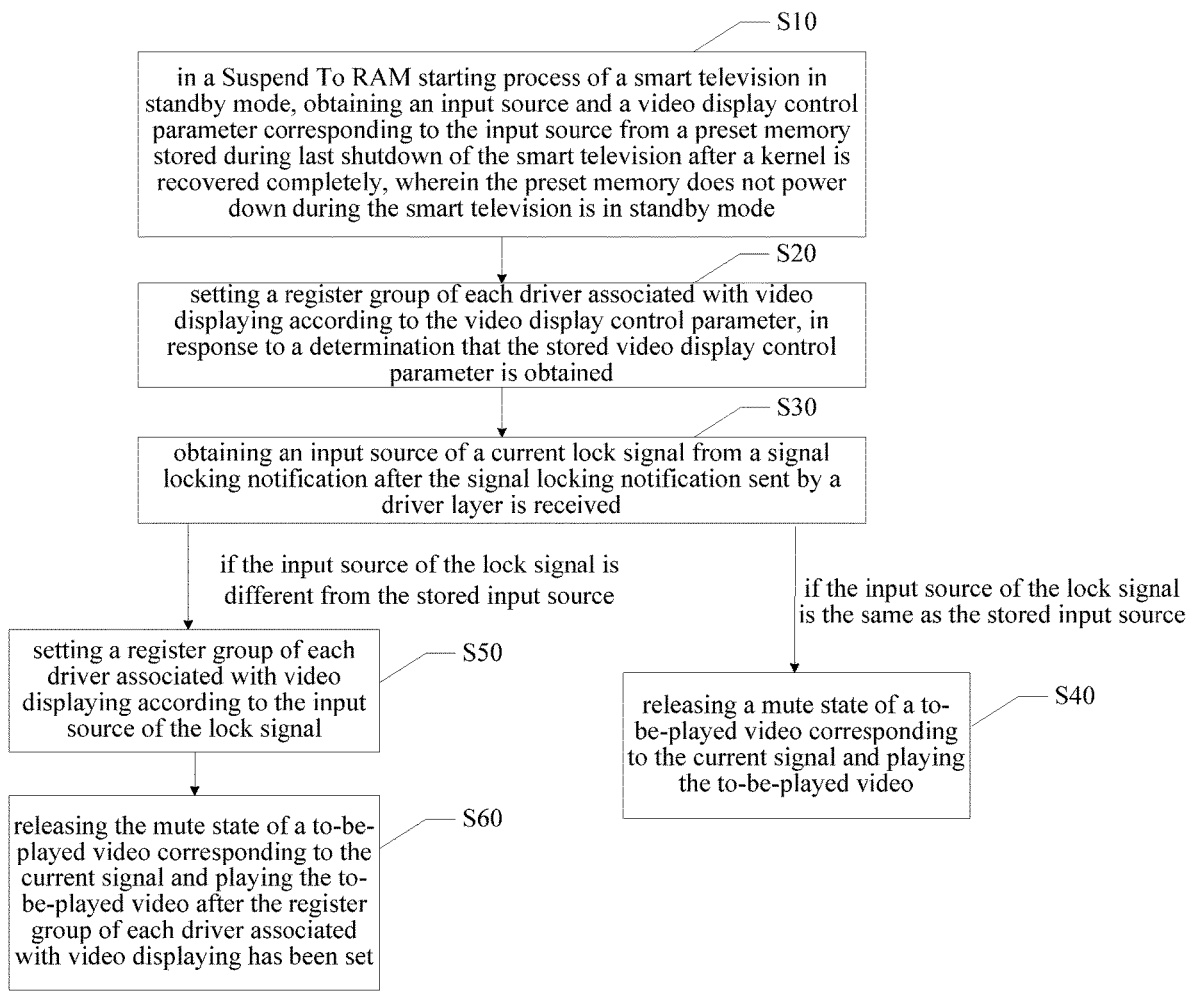
FIG. 3 is a flowchart of the second embodiment of a method for starting smart television in accordance with this disclosure.

Further, a second embodiment of a method for starting smart television is proposed based on the first embodiment. Referring to FIG. 3, in the embodiment, after the step S30, the smart television starting method further includes the following steps S50 to S60.

In S50, if the input source of the lock signal is different from the stored input source, setting a register group of each driver associated with video displaying according to the input source of the lock signal.

In S60, releasing the mute state of a to-be-played video corresponding to the current signal and playing the to-be-played video after the register group of each driver associated with video displaying has been set.

When the smart TV is turned on, the source of this time is different from the source of last shutdown. Then the input source of the lock signal obtained from the signal locking notification will be different from the stored input source. In this case, the video display related driver cannot be set according to the stored video display control parameter, and the notification receiving processing module will let the system reset the video control display parameter according to the changed input source, so that the register data of each driver is set to match with the input source of the lock signal, and then the video picture is displayed. The method of this embodiment can display the video picture normally even if the input source changes.

Further, after the step S10, the smart television starting method further includes the following steps.

If the stored video display control parameter is not obtained, obtaining an input source of a current lock signal from a signal locking notification when the signal locking notification sent by a driver layer is received;

setting a register group of each driver associated with video displaying according to the input source of the lock signal;

releasing a mute state of a to-be-played video corresponding to the current signal and playing the to-be-played video when the register group of each driver is completed setting.

If the stored video display control parameter in the preset memory is lost or is not stored successfully during the shutdown, the stored video display control parameter the video display control parameter may not be obtained from the preset memory at the time of this startup. According to the STR startup mode, when receiving a signal locking notification sent by a driver layer, an input source of a current lock signal is obtained, and the register group of each driver is set according to the input source of the lock signal. After the setting is completed, a mute state of a to-be-played video corresponding to the current signal is released and the to-be-played video is played.

A third embodiment of a method for starting smart television is proposed based on the first embodiment or the second embodiment. If the input source of the lock signal is a digital television signal, then the S40 includes the following refinement steps.

If the input source of the lock signal is the same as the stored input source, releasing a mute state of a to-be-played video corresponding to the current signal and playing the to-be-played video when receiving a notification that audio and video signals sent by the driver layer are synchronized completely.

For the DTV source, when the signal locking notification is received, the video cannot be directly preformed DEMUTE. The MUTE needs to be performed after the notification of the audio and video synchronization is further received. Therefore, if it is determined that the input source of the signal is the same as the stored input source, the notification that the driver layer sends the audio and video signal complete synchronization. When receiving the notification, the mute state of the to-be-played video corresponding to the current signal is released and the to-be-played video is played. If the notification of audio and video synchronization not received, a delay may be waited until the notification receiving processing module receives the notification that the audio and video synchronization is completed.

Further, if the input source of the lock signal is a digital television signal, then the S60 includes the following refinement steps.

After the register group of each driver associated with video displaying is completed setting, releasing a mute state of a to-be-played video corresponding to the current signal and playing the to-be-played video when receiving a notification that audio and video signals sent by the driver layer are synchronized completely.

If the input source of the lock signal is different from the stored input source, and if the current signal is a DTV signal, it is also required to further receiving the audio and video synchronization notification after the setting of the register data of each driver related to the video display is completed. The mute state of the video to be played corresponding to the current signal will cancel and play the video to be played.

The disclosure further provides a method for starting smart television.

Figure 4:
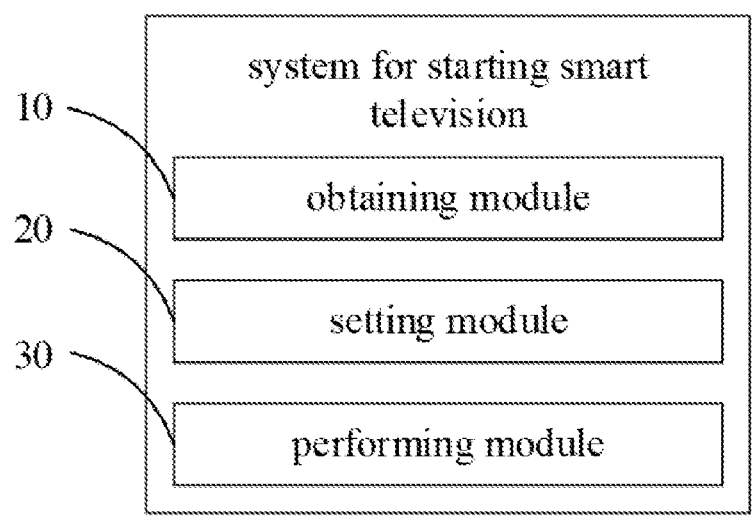
FIG. 4 is a functional block diagram of the first embodiment of a system for starting smart television in accordance with this disclosure.

As shown in FIG. 4, it is a functional block diagram of the first embodiment of a system for starting smart television in accordance with this disclosure.

In this embodiment, the system for starting smart television includes the following parts.

An obtaining module 10, being configured to obtain an input source and a video display control parameter corresponding to the input source from a preset memory stored during last shutdown of the smart television after a kernel is recovered completely, in a Suspend To RAM starting process of a smart television, wherein the preset memory does not power down during the smart television is in standby mode.

A setting module 20, being configured to set a register group of each driver associated with video displaying according to the video display control parameter if the stored video display control parameter is obtained.

In this embodiment, the smart TV is started by the STR mode. After receiving the open command from the remote controller, the standby CPU supplies power to the main SOC chip. After the main SOC chip is powered on, the boot program module (boot & loader) is started firstly. The boot & loader module will load the system running information stored by the smart TV during the last shutdown from the memory, that is, the image saved in the Double Data Rate SDRAM (DDR) memory before the last shutdown, recovering and restoring directly the system including the main CPU. The system kernel module of the operating system restores according to the information stored in the memory. Generally, after the reply of the boot & loader module is completed, the system kernel is also basically restored.

Then, the data recovery of each driver of the system is performed, which mainly includes the data setting of the driver related to the video display and the data setting of the driver other than the driver related to the video display.

Among them, the STR startup mode is a boot mode that suspends to memory. When starting, it does not go through the initialization process, but takes the system recovery and restore process, and directly restores the system running state before the last shutdown from the DDR memory.

In the shutting down process of the smart TV in the STR mode, when the TV is in STR standby, the standby process passes to the driver layer after the standby of the operating system application, architecture, and middleware standby are all finished. The software modules of the driver layer are also standby, in this process, the driver layer backs up the input source of the lock signal and the corresponding video display control parameters into the DDR memory, and the video display control parameters include register group data of various drivers related to the video display.

The video display control parameters mainly include: a frame rate conversion parameter, an image quality parameter, and a Scaler parameter. Among these, the image quality parameter includes: picture color, image quality enhancement, gamma (gamma value, generally related to the distortion of the output image relative to input signal), white balance, brightness, contrast, sharpness, etc.; the Scaler parameter includes resolution format information, zoom window size, position and so on.

In this embodiment, after the kernel module is restored, when the system is running to the process of obtaining the stored video display control parameter, the video display control parameter stored at the last shutdown is read by the obtaining module 10 from the preset memory. When the smart TV is in the STR mode, the preset memory remains unpowered. The preset memory can be DDR memory or the like. After obtaining the video display control parameter, the register group of each driver related to the video display is set by the setting module 20 according to the video display control parameter. Specifically, when the frame rate conversion module drives the restore setting, the register group data related to the frame rate conversion in the video display control parameter is saved before the shutdown from the DDR memory, the data is performed by the setting module 20 to restore to the corresponding frame rate conversion module register group; when the image quality module is driven and restored, the register group data related to the video display control parameters saved before the shutdown are read from the DDR memory. These parameters includes Color, image quality enhancement, gamma, white balance, brightness, contrast, sharpness and other image quality related register group data. The data is restored to the register group corresponding image quality module by the setting module 20. When Scaler module restore settings, the DDR memory is used to read the register group data related to video display control parameters saved before the shutdown, including the resolution format, the zoom window size, and the position. The data is restored by the setting module 20 setting to the corresponding register group of the Scaler module.

It should be noted that the data setting of the driver other than the driver related to the video display may be synchronized with the data setting of the driver related to the video display, or after or before the data setting of the driver related to the video display. And follow the general setup process.

It can be understood that after the above-mentioned drivers are all restored, the system will successively perform recovery of the middleware control software layer, recovery of the architecture and application of the operating system (such as Android system), and finally complete the basic recovery of the system.

It should be noted that the memory of the smart TV can be DDR memory, or any other forms of memory can be powered in the standby state.

The obtaining module 10, being further configured to obtain an input source of a current lock signal from the signal locking notification when a signal locking notification sent by a driver layer is received;

An performing module 30, being configured to release the mute state of a to-be-played video corresponding to the current signal and playing the to-be-played video if the input source of the lock signal is the same as the stored input source.

After completing the recovery of the above-mentioned kernel, driver, middleware control layer, operating system architecture and application, for the TV system, only the basic system is restored, and the TV screen cannot be displayed. To complete the display of the TV screen, the application layer needs to respond to the signal locking notification sent by the driver layer and further process it.

For smart TVs, users can use different sources according to their needs, such as Digital TV (DTV) Signal source, Analog TV signal (ATV) source, High Definition Multimedia Interface (HDMI) source, color difference component interface (YPbYr) source, etc. For different signal sources, the signal resolution corresponding to the signal and the refresh rate of the video are different.

Referring to FIG. 2, after the driving layer locks the video signal according to the signal source used by the smart TV, the driving signal status notification module sends a signal locking notification to the application layer, where the signal locking notification includes an input source of the locking signal, in the application. When the application layer receives the signal locking notification sent by the driver layer, the input source of the lock signal is obtained from the signal locking notification by the obtaining module 10, where the signal resolution corresponding to the signal and the refresh rate of the video are different for different signal sources. Therefore, when judging whether the input source of the lock signal is the same as the stored input source, it can be judged according to the signal resolution and/or the refresh rate of the video.

If they are the same, an interface function used by the performing module 30 to the MUTE demodulation can be directly called to unmute the video screen and sound, the video is displayed from the display screen, and the sound will be played out from the speaker to achieve the video playing of the corresponding signal. When the video to be played is in a mute state, the display screen is a blue screen or a black screen, and the like, and the sound is muted. The so-called unmute state refers to the video to be played is displayed by the video MUTE/UNMUTE control module, the sound of the video is played through the speaker.

Generally, after the user selects the source when using the smart TV, the input source is generally determined. Therefore, the input source of the smart TV at the current startup is the same as that of the last shutdown. Therefore, in this case, the display speed of the television screen can be accelerated in this way.

The starting system of the smart television proposed by the disclosure, in a Suspend To RAM (STR) starting process of a smart television, obtaining an input source and a video display control parameter corresponding to the input source from a preset memory stored during last shutdown of the smart television after a kernel is recovered completely, setting a register group of each driver associated with video displaying according to the video display control parameter, obtaining an input source of a current lock signal from the signal locking notification when a signal locking notification sent by a driver layer is received. If the input source of the lock signal is the same as the stored input source, releasing a mute state of a to-be-played video corresponding to the current signal and playing the to-be-played video. In this way, in the process of starting the smart TV by the STR mode, the register group of each driver related to the video display can be set according to the stored video display control parameter in the drive recovery and restoration phase, and the lock signal is received after receiving the signal locking notification. If the input source is the same as the stored input source, and the video is directly decoded by MUTE. Compared with the existing mode startup process, the time taken to set the video display control parameters is greatly shortened, and the display speed of the screen during the startup process of the smart TV is improved. In turn, it increases its startup speed.

Further, a second embodiment of a system for starting smart television is proposed based on the first embodiment. In this embodiment, the setting module 20 set a register group of each driver associated with video displaying according to the input source of the lock signal if the input source of the lock signal is different from the stored input source.

The performing module 30 is further configured to release the mute state of a to-be-played video corresponding to the current signal and playing the to-be-played video after the register group of each driver associated with video displaying has been set.

When the smart TV is turned on, the source of this time is different from the source of last shutdown. Then the input source of the lock signal obtained from the signal locking notification will be different from the stored input source. In this case, the video display related driver cannot be set according to the stored video display control parameter, and the setting module 20 will reset the video control display parameter according to the changed input source, so that the register data of each driver is set to match with the input source of the lock signal, and then the video picture is displayed by the performing module 30. The method of this embodiment can display the video picture normally even if the input source changes.

Further, the obtaining module 10, is configured to obtain an input source of a current lock signal from a signal locking notification when the signal locking notification sent by a driver layer is received, if the stored video display control parameter is not obtained.

The setting module 20 is further configured to set a register group of each driver associated with video displaying according to the input source of the lock signal.

The performing module 30 is further configured to release the mute state of a to-be-played video corresponding to the current signal and playing the to-be-played video when the register group of each driver is completed setting.

If the stored video display control parameter in the preset memory is lost or is not stored successfully during the shutdown, the stored video display control parameter the video display control parameter may not be obtained from the preset memory of obtaining module 10 at the time of this startup. According to the STR startup mode, when receiving a signal locking notification sent by a driver layer, an input source of a current lock signal is obtained, and the register group of each driver is set according to the input source of the lock signal. After the setting is completed, a mute state of a to-be-played video corresponding to the current signal is released and the to-be-played video is played.

A third embodiment of a system starting smart television is proposed based on the first embodiment or the second embodiment. In this embodiment, if the input source of the lock signal is a digital television signal, then the performing module 30 is further configured to release a mute state of a to-be-played video corresponding to the current signal and playing the to-be-played video when receiving a notification that audio and video signals sent by the driver layer are synchronized completely, if the input source of the lock signal is the same as the stored input source.

For the DTV source, when the signal locking notification is received, the video cannot be directly preformed DEMUTE. The MUTE needs to be performed after the notification of the audio and video synchronization is further received. Therefore, if it is determined that the input source of the signal is the same as the stored input source, the notification that the driver layer sends the audio and video signal complete synchronization. When receiving the notification, the mute state of the to-be-played video corresponding to the current signal is released by the performing module 30 and the to-be-played video is played. If the notification of audio and video synchronization not received, a delay may be waited until the notification receiving processing module receives the notification that the audio and video synchronization is completed.

Further, the performing module 30 is configured to release the mute state of a to-be-played video corresponding to the current signal and playing the to-be-played video when receiving a notification that audio and video signals sent by the driver layer are synchronized completely after the register group of each driver associated with video displaying is completed setting.

If the input source of the lock signal is different from the stored input source, and if the current signal is a DTV signal, it is also required to further receiving the audio and video synchronization notification after the setting of the register data of each driver related to the video display is completed. The mute state of the video to be played corresponding to the current signal will cancel and play the video to be played by the performing module 30.

The foregoing description merely portrays some illustrative embodiments according to the disclosure and therefore is not intended to limit the patentable scope of the disclosure. Any equivalent structural or flow transformations that are made taking advantage of the specification and accompanying drawings of the disclosure and any direct or indirect applications thereof in other related technical fields shall all fall in the scope of protection of the disclosure.

What is claimed is:

1. A method for starting smart television, wherein the method comprises:
in a Suspend To RAM starting process of a smart television in standby mode, obtaining an input source and a video display control parameter corresponding to the input source from a preset memory stored during last shutdown of the smart television after a kernel is recovered completely, wherein the preset memory does not power down during the smart television is in standby mode;
setting a register group of each driver associated with video displaying according to the video display control parameter in response to a determination that the stored video display control parameter is obtained;
after a signal locking notification sent by a driver layer is received, obtaining an input source of a current lock signal from the signal locking notification, wherein, the input source of the lock signal is a digital television signal;
in response to a determination that the input source of the lock signal is the same as the stored input source, releasing the mute state of a to-be-played video corresponding to the current signal and playing the to-be-played video after receiving a notification that audio and video signals sent by the driver layer are synchronized completely;
in response to a determination that the input source of the lock signal is different from the stored input source, setting a register group of each driver associated with video displaying according to the input source of the lock signal; releasing a mute state of a to-be-played video corresponding to the current signal and playing the to-be-played video after the register group of each driver associated with video displaying has been set;
in response to a determination that the stored video display control parameter is not obtained, obtaining an input source of a current lock input source the signal locking notification after a signal locking notification sent by a driver layer is received; setting a register group of each driver associated with video displaying according to the input source of the lock signal; releasing a mute state of a to-be-played video corresponding to the current signal and playing the to-be-played video after the register group of each driver has been set.

2. A method for starting smart television, wherein the method comprises:
in a Suspend To RAM starting process of a smart television in standby mode, obtaining an input source and a video display control parameter corresponding to the input source from a preset memory stored during last shutdown of the smart television after a kernel is recovered completely, wherein the preset memory does not power down during the smart television is in standby mode;
setting a register group of each driver associated with video displaying according to the video display control parameter, in response to a determination that the stored video display control parameter is obtained;
obtaining an input source of a current lock signal from a signal locking notification after the signal locking notification sent by a driver layer is received; and
in response to a determination that the input source of the lock signal is the same as the stored input source, releasing a mute state of a to-be-played video corresponding to the current signal and playing the to-be-played video.

3. The method of claim 2, wherein the method further comprises, subsequent to the operation of obtaining an input source and a video display control parameter corresponding to the input source from a preset memory stored during last shutdown of the smart television:
in response to a determination that the stored video display control parameter is not obtained, obtaining an input source of a current lock signal from a signal locking notification after the signal locking notification sent by a driver layer is received;
setting a register group of each driver associated with video displaying according to the input source of the lock signal; and releasing the mute state of a to-be-played video corresponding to the current signal and playing the to-be-played video after the register group of each driver has been set.

4. The method of claim 3, wherein the input source of the lock signal is a digital television signal, the operation of releasing the mute state of a to-be-played video corresponding to the current signal and playing the to-be-played video after the register group of each driver has been set comprises:

after the register group of each driver associated with video displaying is completed setting, releasing a mute state of a to-be-played video corresponding to the current signal and playing the to-be-played video in response to receiving a notification that audio and video signals sent by the driver layer are synchronized completely.

5. The method of claim 2, wherein the input source of the lock signal is a digital television signal, the operation of in response to a determination that the input source of the lock signal is the same as the stored input source, releasing a mute state of a to-be-played video corresponding to the current signal and playing the to-be-played video comprises:

in response to the determination that the input source of the lock signal is the same as the stored input source, releasing the mute state of the to-be-played video corresponding to the current signal and playing the to-be-played video after receiving a notification that audio and video signals sent by the driver layer are synchronized completely.

6. The method of claim 5, wherein the method further comprises, subsequent to the operation of obtaining an input source of a current lock signal from a signal locking notification after the signal locking notification sent by a driver layer is received comprises:

in response to a determination that the input source of the lock signal is different from the stored input source, setting a register group of each driver associated with video displaying according to the input source of the lock signal; and releasing the mute state of a to-be-played video corresponding to the current signal and playing the to-be-played video after the register group of each driver associated with video displaying has been set.

7. The method of claim 6, wherein the operation of releasing the mute state of a to-be-played video corresponding to the current signal and playing the to-be-played video after the register group of each driver associated with video displaying has been set comprises:

after the register group of each driver associated with video displaying is completed setting, releasing the mute state of the to-be-played video corresponding to the current signal and playing the to-be-played video in response to receiving a notification that audio and video signals sent by the driver layer are synchronized completely.

8. A system for starting smart television, comprising at least one processor and a non-transitory program storage medium storing program instructions, wherein the program instructions are executable by the at least one processor to perform:

obtaining an input source and a video display control parameter corresponding to the input source from a preset memory stored during last shutdown of a smart television after a kernel is recovered completely, in a Suspend To RAM starting process of the smart television in standby mode, wherein the preset memory does not power down during the smart television is in standby mode;

setting a register group of each driver associated with video displaying according to the video display control parameter if the stored video display control parameter is obtained;

obtaining an input source of a current lock signal from a signal locking notification after the signal locking notification sent by a driver layer is received; and releasing the mute state of a to-be-played video corresponding to the current signal and playing the to-be-played video if input source of the lock signal is the same as the stored input source.

9. The system of claim 8, wherein the program instructions are executable by the at least one processor to perform:

obtaining an input source of a current lock signal from a signal locking notification after the signal locking notification sent by a driver layer is received, in response to a determination that the stored video display control parameter is not obtained;

setting a register group of each driver associated with video displaying according to the input source of the lock signal;

releasing a mute state of a to-be-played video corresponding to the current signal and playing the to-be-played video after the register group of each driver has been set.

10. The system of claim 9, wherein the input source of the lock signal is a digital television signal, and the program instructions are executable by the at least one processor to perform:

after the register group of each driver associated with video displaying has been set, releasing the mute state of a to-be-played video corresponding to the current signal and playing the to-be-played video in response to receiving a notification that audio and video signals sent by the driver layer are synchronized completely.

11. The system of claim 8, wherein the input source of the lock signal is a digital television signal, the program instructions are executable by the at least one processor to perform:

releasing the mute state of a to-be-played video corresponding to the current signal and playing the to-be-played video in response to receiving a notification that audio and video signals sent by the driver layer are synchronized completely, in response to a determination that the input source of the lock signal is the same as the stored input source.

12. The system of claim 11, wherein the input source of the lock signal is a digital television signal, and the program instructions are executable by the at least one processor to perform:

after the register group of each driver associated with video displaying has been set, releasing the mute state of a to-be-played video corresponding to the current signal and playing the to-be-played video in response to receiving a notification that audio and video signals sent by the driver layer are synchronized completely.

13. The system of claim 11, wherein the program instructions are executable by the at least one processor to perform:

setting a register group of each driver associated with video displaying according to the input source of the lock signal, in response to a determination that the input source of the lock signal is different from the stored input source; and releasing the mute state of a to-be-played video corresponding to the current signal and playing the to-beplayed video after the register group of each driver associated with video displaying is completed setting.

14. The system of claim 13, wherein the program instructions are executable by the at least one processor to perform:
after the register group of each driver associated with video displaying has been set, releasing the mute state of a to-be-played video corresponding to the current signal and playing the to-be-played video in response to receiving a notification that audio and video signals sent by the driver layer are synchronized completely.

* * * * *

UNITED STATES PATENT AND TRADEMARK OFFICE
CERTIFICATE OF CORRECTION

PATENT NO. : 10,631,051 B2
APPLICATION NO. : 16/307939
DATED : April 21, 2020
INVENTOR(S) : Gaobo Huang Page 1 of 1

It is certified that error appears in the above-identified patent and that said Letters Patent is hereby corrected as shown below:

On the Title Page

Item (30), the foreign application priority data should read 201610395623.2 instead of 20161035623.

Signed and Sealed this
Twenty-first Day of July, 2020

Andrei Iancu
*Director of the United States Patent and Trademark Office*